(12) United States Patent
Li (10) Patent No.: US 12,287,865 B2
(45) Date of Patent: Apr. 29, 2025

(54) SYSTEM AND METHOD FOR SAFELY AUTOFILLING LOGIN FIELDS IN COMPUTING SOURCES (71) Applicant: Blue Space Information Technology Co., Ltd.

(72) Inventor: Wei Li, Guangzhou (CN)

(73) Assignee: Blue Space Information Technology Co., Ltd., Guangdong (CN)

( * ) Notice: Subject to any disclaimer, the term of this patent is extended or adjusted under 35 U.S.C. 154(b) by 224 days.

(21) Appl. No.: 17/866,481

(22) Filed: Jul. 16, 2022

(65) Prior Publication Data
US 2024/0020376 A1 Jan. 18, 2024

(51) Int. Cl.
H04L 29/00 (2006.01)
G06F 21/46 (2013.01)

(52) U.S. Cl.
CPC .................................. G06F 21/46 (2013.01)

(58) Field of Classification Search
CPC ....................................................... G06F 21/46
USPC ........................................................... 726/18
See application file for complete search history.

(56) References Cited

U.S. PATENT DOCUMENTS 10,942,959 B1 * 3/2021 Haider ................ G06F 21/6218
2016/0359831 A1 * 12/2016 Berlin ..................... H04L 63/08

* cited by examiner

Primary Examiner — Jeffrey C Pwu
Assistant Examiner — Michael D Anderson
(74) Attorney, Agent, or Firm — Law Offices of Konrad Sherinian, LLC; Depeng Bi (57) ABSTRACT A new password manager for safely autofilling login user login credentials performs multiple layers of security check to protect users' confidential data. User interface elements of a computing source, such as a web page or a mobile app, are parsed for determining that password input fields are present. In such a case, a autofill control is displayed for activating user authentication for accessing the password manager. The password manager determines a computing source identifier of the computing source, determines a list of context identifiers corresponding to the computing source, performs computing security check, matches the computing source identifier to an account, and selects an account. The password manager then performs account security check on the selected account. When the security check is successful, the password manager autofills the login password input field with login data associated with the selected account.

17 Claims, 7 Drawing Sheets

SYSTEM AND METHOD FOR SAFELY AUTOFILLING LOGIN FIELDS IN COMPUTING SOURCES

CROSS REFERENCE TO RELATED APPLICATIONS

NONE.

FIELD OF THE DISCLOSURE

The present invention generally relates to password managers running on electronic devices, and more particularly relates to a password manager that safely autofills login fields of web pages and mobile apps. More particularly still, the present disclosure relates to a system and method for safely autofilling login fields of web pages and mobile apps with data from an autofill security database that reflects data updates based on users' decisions.

DESCRIPTION OF BACKGROUND

Creating unique and strong passwords for logging into various online accounts (such as bank accounts, etc.) is highly desired for addressing security concerns. However, remembering the strong and unique passwords and other sensitive information is very challenging for most people. Accordingly, password managers have been proposed to store the credentials (such as login user name, login password, website URL, etc.) for users. When a user visits a website or opens an app (meaning a mobile application/app) that requires her/him to log in, the password manager automatically fills in the login name and password for the user.

A password manager is a computer software application. For example, it can be an extension as a plug-in for a web browser, such as the Google Chrome and Mozilla Firefox web browsers, running on a desktop computer, a laptop computer, etc. Through the web browser's Document Object Model (DOM)'s Application Programming Interface (API), a password manager identifies the login form of a web page, and automatically fills in the login form with the user's login data, such as a login name and a password. On electronic devices running an Android operating system, such as Android 8.0 (with API level 26) or higher, there is an autofill framework that allows password managers to auto fill users' login names and passwords in mobile apps and mobile web browsers. The autofill framework provides an AssistStructure and corresponding APIs for password managers to obtain application identifiers (also referred to herein as APP IDs and app ids) of mobile apps and login frames with the apps.

On electronic devices running the iOS operating system, there is a Password AutoFill API for password managers to automatically fill users' confidential credentials in mobile apps and mobile web browsers. For a web page, a conventional password manager obtains the address (such as URL) of the web page and uses it to determine a matching login credential. For a mobile app, the conventional password manager obtains the iOS app's developer's associated domain name and uses it to determine a matching login credential.

Password managers provide numerous features and benefits for users. For example, a password manager may be able to identify and thwart phishing. Phishing is one type of online fraud and identification theft. For instance, an online attacker may send a fraudulent message designed to trick a person into revealing sensitive information to the attacker. The message tricks the user to regard, for example, goog1e.com (with the numerical one between the letters g and e) as the legitimate URL google.com (with the alphabet letter -el between the letters g and e). Once the sensitive information, such as login name and password, is entered to goog1e.com by the user, it is then stolen by the attacker. A password manager can identify the phishing scheme and refuses to auto fill (meaning automatically fill) the user's password and even login name on goog1e.com.

However, while conventional password managers with autofill capabilities make it convenient for users to input passwords and other information, they also present numerous deficiencies and defects. They present an attack surface that can be exploited by malicious apps and webpages to steal users' confidential personal data. When a user registers an account on www.example.com, the webpage is redirected to accounts.example.com when the user tries to login her/his account. In such a case, a conventional password manager refuses to auto fill the login credentials (such as login name, password, etc.) on the accounts.example.com webpage since it views www.example.com and accounts.example.com as two different domains or websites. This is not desirable. As another example, after the user creates the account on www.example.com, she/he installs a mobile app provided by the website's provider on the user's Android smartphone with the mobile app's app id being com.example.android. The conventional password manager then fails to recognize the Android app's relationship with the website www.example.com, and refuses to auto fill the user's credentials in the mobile app. This is also not desirable. As an additional example, after the user creates the account on www.example.com, she/he installs a mobile app provided by the website's provider on the user's iPhone with the app's associated domain ios.example.com or even some other domain ios.myexample.com. The conventional password manager then fails to recognize the iPhone app's relationship with the website www.example.com, and refuses to auto fill the user's credentials in the iPhone mobile app. This is not desirable either.

A conventional password manager may also contain a defect, such as a software bug or a defective design, that can be exploited by a malicious website or computer software program. The consequence is the theft of the user's password and login name. For example, the conventional password manager may auto fill the user's login name and password for accessing the website www.example.com to the malicious website http://exampleavlidienbrunn.se/@www.example.com/@hehe.php.

Developers of mobile apps for Android smartphones can assign arbitrary app ids to their mobile apps. For example, a mobile app with the app id of com.example.android may be entirely unrelated to the website www.example.com. In such a case, a conventional password manager using heuristic techniques (such as heuristic matching and suggestion) may undesirably auto fill the password to the user's account on the website www.example.com to the malicious mobile app of the app id of com.example.android. Moreover, conventional password managers oftentimes auto fill confidential data (such as password) to a malicious webpage with an invisible password input field or form.

Accordingly, there is a need for a new password manager that auto fills a user's credentials in a webpage or a mobile app (such as an Android app and an iOS app), and assures that the autofill is secure without the credentials stolen by a malicious website or a mobile app. The new system and method thus provide the benefits of the conventional password managers and overcomes the shortcomings and defects of the same.

SUMMARY OF THE DISCLOSURE

Generally speaking, pursuant to the various embodiments, the present disclosure provides a computer-implemented method for safely autofilling login fields in computing sources. The method is performed by a password manager adapted to run in an electronic device and includes receiving an autofill indicator indicating that an autofill control has been activated; in response to the autofill indicator, authenticating an user to assure that the user is authorized to access the password manager; building an autofill security database; determining a list of context identifiers of a computing source based on a computing source identifier of the computing source, which includes a login input field; and displaying the list of context identifiers on a display screen of the electronic device. The electronic device includes a processing unit; a network interface operatively coupled to the processing unit; a video output interface operatively coupled to the processing unit; a memory element operatively coupled to the processing unit; and an input interface operatively coupled to the processing unit. The method further includes performing a computing source autofill security check on the computing source; when the computing source autofill security check is successful, matching the computing source to an account according to the autofill security database; displaying the matched account on the display screen of the electronic device; selecting an account for autofilling the login input field, wherein the selected account is the matched account or a different account; performing an account autofill security check on the selected account; and when the account source autofill security check is successful, autofilling the login input field with login data associated with the selected account. The method further includes parsing user interface elements of the computing source to determine that the login input field in present in the computing source; determining the computing source identifier of the computing source; and displaying an autofill control, wherein activating the autofill control causes the autofill indicator generated. The autofill security database includes an autofill account database, an autofill Android browser database, or an autofill Android app certificate signature database. Performing a computing source autofill security check on the computing source includes performing an autofill desktop browser security check on the computing source, performing an autofill Android security check on the computing source, or performing an autofill iOS security check on the computing source. Matching the computing source to an account according to the autofill security database includes matching the computing source to the matched account according to the autofill security database in a desktop system; matching the computing source to the matched account according to the autofill security database in an Android system; or matching the computing source to the matched account according to the autofill security database in an iOS system. Performing an account autofill security check on the selected account includes performing an autofill desktop browser security check on the selected account; performing an autofill Android security check on the selected account; or performing an autofill iOS security check on the selected account. The method further includes updating the autofill security database based on a user input. In one implementation, the list of context identifiers includes at least one of an Android app ID, an iOS associated domain, a filling username identifier or a filling password identifier associated with the computing source. In a further implementation, the list of context identifiers includes at least one of a website address, a website logo or a mobile app logo associated with the computing source. The autofill security database includes at least a collection of login website, a collection of Android app IDs, a collection of Android app certificate signatures, or a collection of associated iOS domains.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
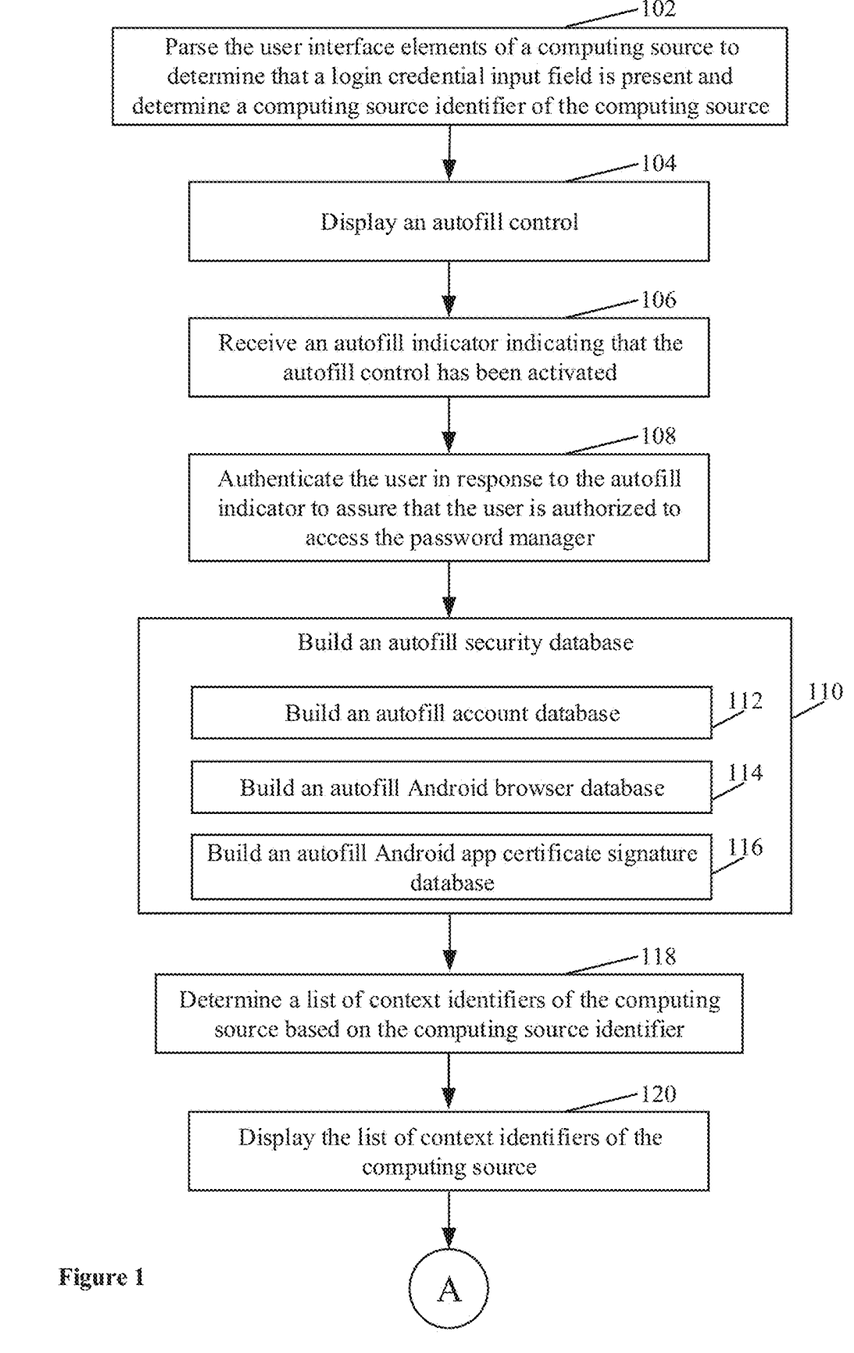
FIG. 1 is a flowchart illustrating a process by which a password manager securely autofills login fields of a computing source with confidential credential data in accordance with this disclosure.
Figure 2:
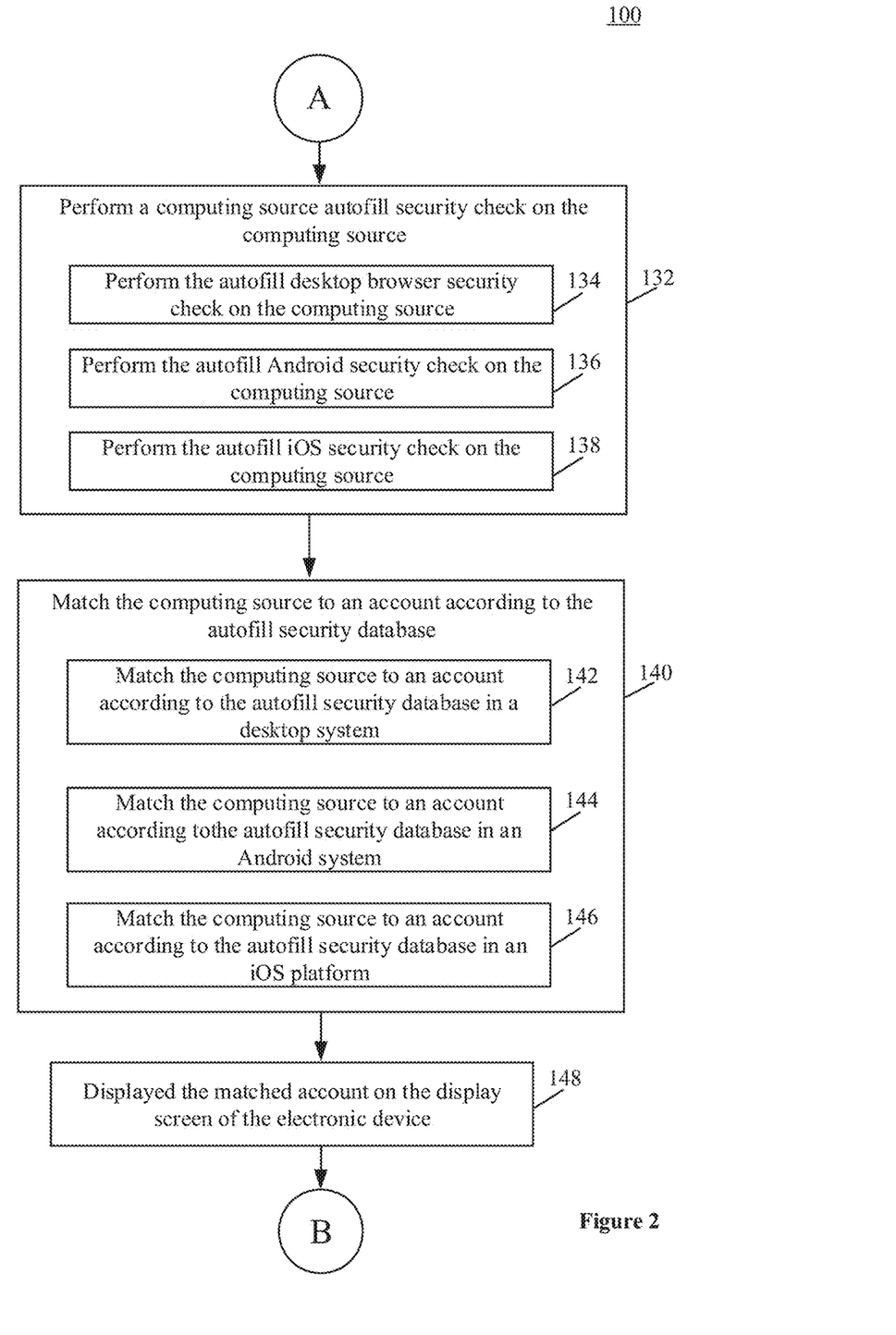
FIG. 2 is a flowchart illustrating a process by which a password manager securely autofills login fields of a computing source with confidential credential data in accordance with this disclosure.
Figure 3:
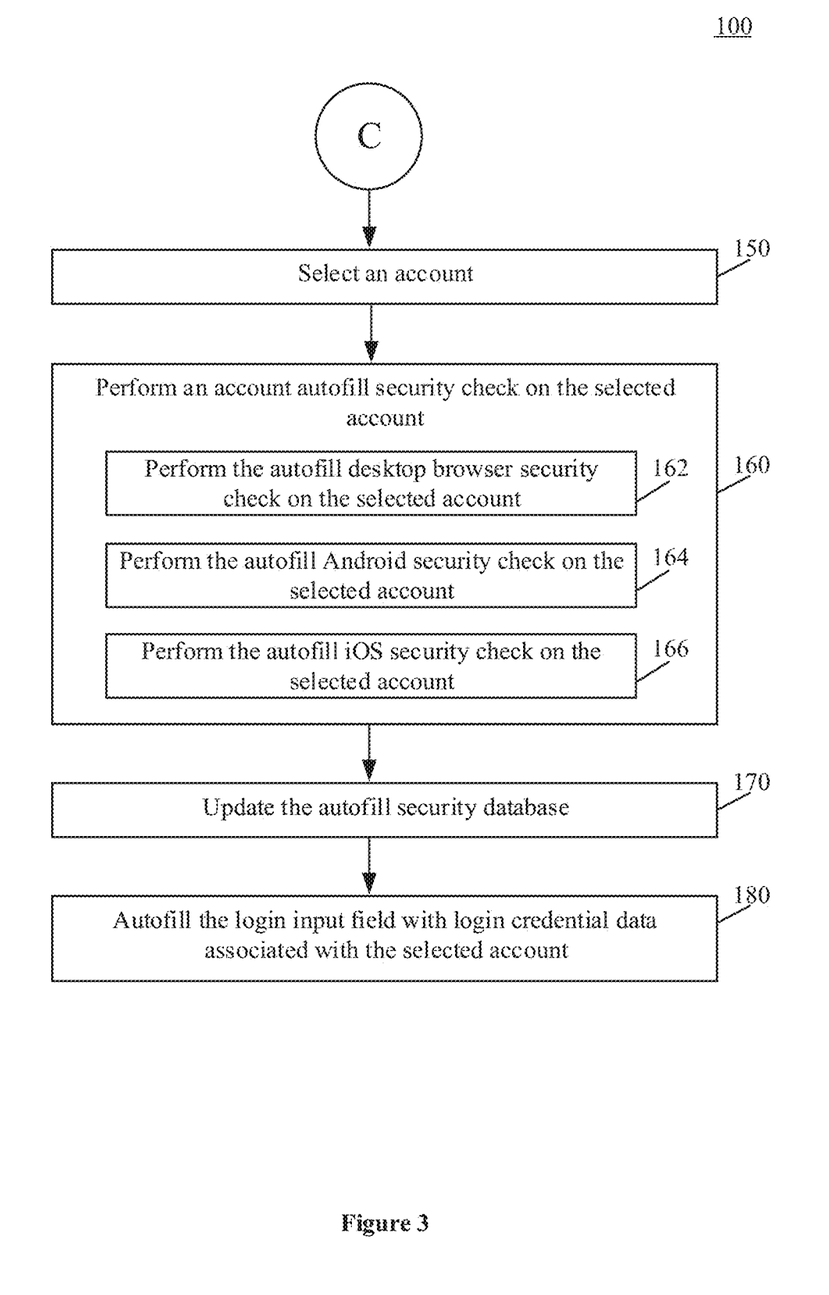
FIG. 3 is a flowchart illustrating a process by which a password manager securely autofills login fields of a computing source with confidential credential data in accordance with this disclosure.

Turning to the Figures and to FIGS. 1, 2 and 3 in particular, a flowchart illustrating a system and method for securely autofilling a user's credential data is shown and generally indicated at 100. The new method 100 is performed by an improved password manager running on an electronic device, such as a smartphone, a tablet computer, a laptop computer or a desktop computer. The improved password manager improves the functionality of conventional password managers. In one embodiment, it is a specialized computer software application, programmed using computer programing languages (such as C, C++, Java, etc.). The improved password manager and the electronic device are further shown in FIG. 4.

Figure 4:
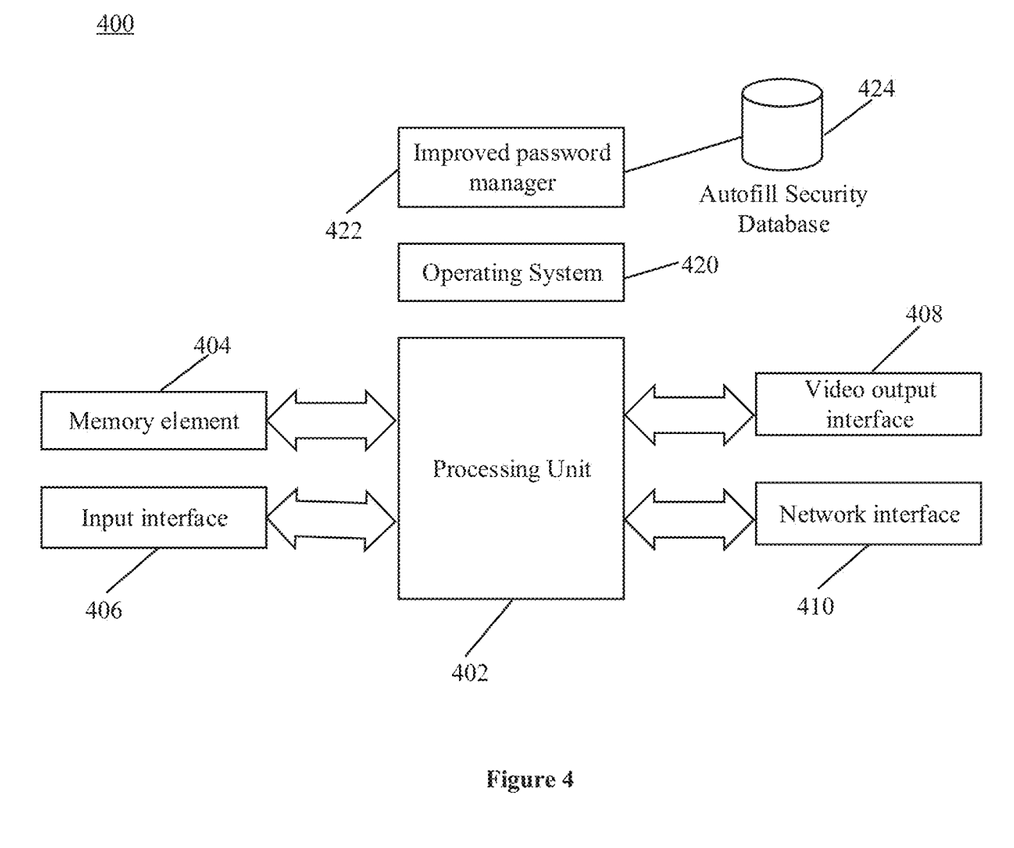
FIG. 4 is a block diagram illustrating an electronic device with a new password manager in accordance with this disclosure.

Referring now to FIG. 4, a simplified block diagram of the illustrative electronic device with a new password manager is shown and generally indicated at 400. The electronic device (such as a desktop computer, a laptop computer, a tablet computer or a smartphone) 400 includes at least a processing unit (such as a central processing unit (CPU)) 402, some amount of memory 404 operatively coupled to the processing unit 402, a network interface 410 operatively coupled to the processing unit 402, an input interface 406 operatively coupled to the processing unit 402, and a video output interface 408 operatively coupled to the processing unit 402. The input interface 406 can be a touchscreen, an audio based input interface, etc. The device 400 also includes an operating system 420 (such as a Windows operating system running on a desktop computer or a laptop computer, an Android operating system or an iOS operating system) running on the processing unit 402. The electronic device 400 further includes the improved password manager indicated at 422 and an autofill security database 424 operatively coupled to the new password manager 422. The password manager 422 accesses (such as read and write) the autofill security database 424. The password manager 422 can be a web browser plug-in or a mobile app. In one implementation, the password manager 422 is operatively coupled to an additional database, which is referenced hereto as a vault database. The vault database saves user accounts and the data therein is encrypted while the data in the autofill security data is not encrypted.

Turning back to FIGS. 1-3, at 102, the password manager 422 parses the user interface elements of a computing source (also referred to herein as login domain identifier to determine that a login credential input field (such as a login password) is present. When no login input fields are present, the remaining elements of the method 100 are not performed. The computing source can be a web page loaded by a web browser (such as a mobile browser, a desktop Google Chrome browser, etc.). It can also be a mobile app, such as an iOS mobile app. At 102, the password manager 422 further determines a computing source identifier of the computing source. The computing source identifier can be a mobile app ID or a web page address including a domain. In one implementation, the web domain is used as the login domain identifier for a web page; the associated web domain is used as the login domain identifier for an iOS app; and the app id is used as the login domain identifier for an Android app. If the web page is loaded inside an Android app, the present teachings further checks whether the Android app is a safe browser.

At 104, the password manager 422 displays an autofill control. In one implementation, the autofill control is a user interface button. Once a user clicks it (or touches it on a touchscreen input interface), at 106, the password manager 422 receives an autofill indicator indicating that the autofill control has been activated or clicked. In response to the autofill indicator, at 108, the password manager 422 authenticates the user to assure that the user is authorized to access the password manager 422. In other words, only after the user is successfully authenticated, the autofill features (such as the elements 110, 118, etc.) of the present disclosure become available to the user. To authenticate the user, at 108, the password manager 422 may retrieve the user's master password before it authenticates the user's login credentials. The elements 102 and 104 are generally performed by the operating system on an electronic device running an iOS operating system. In such a case, the password manager 422 does not perform any actual function.

The autofill security database 424 is prebuilt. A developer builds the autofill security database 424 with collected websites and their login web domains, Android app IDs, iOS app's associated web domains, Android app certificate signatures, Android app ID list of safe web browsers etc. The autofill security database 424 can be bundled with an app and available immediately after installation of the app, or downloaded from the Internet on launching. At 110, the password manager 422 builds the autofill security database 424. In a different implementation, the autofill security database 424 is built by a different computer software application. In such a case, the autofill security database building software application is regarded as a part of the password manager 422. Depending on the operating system 420, at 110, the password manager 422 builds the autofill security database with different types of data or databases. For example, at 112, the password manager 422 builds an autofill account database. In such a case, it is said that the autofill security database 424 includes the autofill account database. At 114, the password manager 422 builds an autofill Android browser database. In such a case, it is said that the autofill security database 424 includes the autofill Android browser database containing safe Android web browser app IDs. At 116, the password manager 422 builds an autofill Android app certificate signature database containing Android app certificate signatures. In such a case, it is said that the autofill security database 424 includes the autofill Android app certificate signature database.

Taking zoom.us as an example, when the user creates an account with zoom.us, the access data of this account is saved into the autofill security database 424. The user then installs the mobile app, i.e., zoom app from zoom.us, on her/his iPhone. When the user accesses the zoom app on the iPhone, the password manager 422 determines that the associated domain name of the zoom app is zoomgov.com, and then determines that zoomgov.com is the associated domain in iOS platforms and zoom.us is the associated domain of the zoom.us account on the Internet based on the autofill security database 424. They are in the same account system. The autofill security database 424 stores both the login website and the associated iOS web domains. Accordingly, the password manager 422 autofills the zoom app with the login data of the zoom.us account.

The autofill account database 112 includes one or more types of data for every account system. For example, the autofill account database includes computing source identifiers, such as mobile app identifiers and web site identifiers. For instance, google.com, microsoft.com, and apple.com are illustrative computing source identifiers. In a further implementation, it includes mobile app logos and logos of web sites hosting web pages. In a further implementation, it includes the associated login websites corresponding to computing source identifiers. For example, for the computing source identifier wikipedia.org, the autofill account database 112 records all associated websites that users can login, such as en.wikipedia.org, zh.wikipedia.org, and www.mediawiki.org without security concerns. An account with wikipedia.org allows the account owner to login en.wikipedia.org, zh.wikipedia.org, wikipedia Android app and wikipedia iOS app. The accounts with the different websites and mobile apps are referred to herein an account system.

The autofill account database 112 can further includes associated Android app IDs of each Android app ID in the database 112. For instance, for microsoft.com, autofill account database also stores the associated Android app IDs, such as com.microsoft.office.outlook, com.microsoft.office-.word and com.microsoft.emmx.

For each iOS mobile app (or iOS app for short) in the autofill account database 112, the autofill account database 112 stores its associated domains. For iOS mobile apps, the password manager 422 usually cannot obtain their iOS app IDs in an automatic manner. For example, the associated domain of Zoom iOS app is zoomgov.com, but not zoom.us. Therefore, it is desirable for the autofill account database 112 to keep track of the correct associated domains of each iOS app indicated in the database. Some conventional password managers use heuristic matching techniques. For instance, they regard ios.example.com as an associated domain of www.example.com, and allows autofill into ios.example.com with login credentials of www.example.com. However, such an approach can easily be used by hackers to steal confidential credentials. For example, a hacker publishes an app associated with blog.example.com which she/he has hacked, and then steals login data of the computing source www.example.com. The present disclosure avoids this type of security flaws.

The autofill Android browser database 114 includes secure web browser identifiers identifying secure web browsers, such as com.microsoft.emmx for the Edge web browser, com.android.chrome for the Google Chrome web browser, and org.mozilla.firefox for the Firefox web browser. Inputting confidential login credentials (such as passwords) is usually secure since the makers of the web browsers do not steal users' personal private data. The autofill Android app certificate signature database 116 includes Android mobile apps' developers' signatures, which are required when they publish Android mobile apps (or Android apps for short). The element 110 can be performed before the element 102. Furthermore, the element 110 is not necessarily performed every time the password manager 422 is executed. It is usually built and referenced thereafter. The autofill security database 424 is accessed by the password manager 422 each time the autofill feature is used.

Based on the computing source identifier determined at 102, at 118, the password manager 422 determines a list of context identifiers of the computing source identified by the computing source identifier. The context identifiers in the list are extracted from the computing source during the parsing of the same. The list of context identifiers includes one or more of, for example, the logo of the mobile app, the logo of the web page or website, the address of the web page or website, and the mobile app ID that are associated with the computing source identifier.

Figure 5:
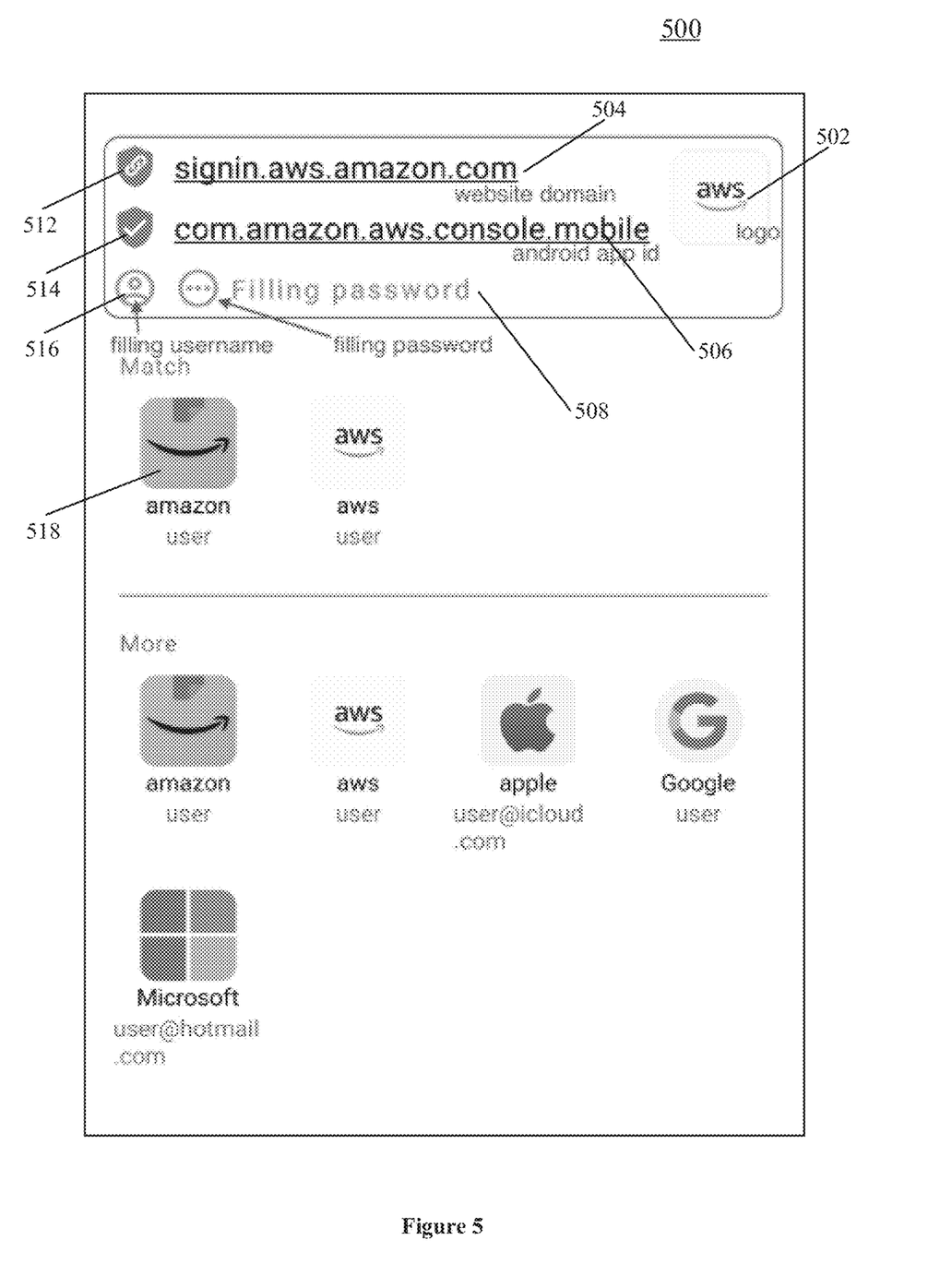
FIG. 5 is a block diagram illustrating an screen shot of the displayed context identifiers of a new password manager in accordance with this disclosure.
Figure 6:
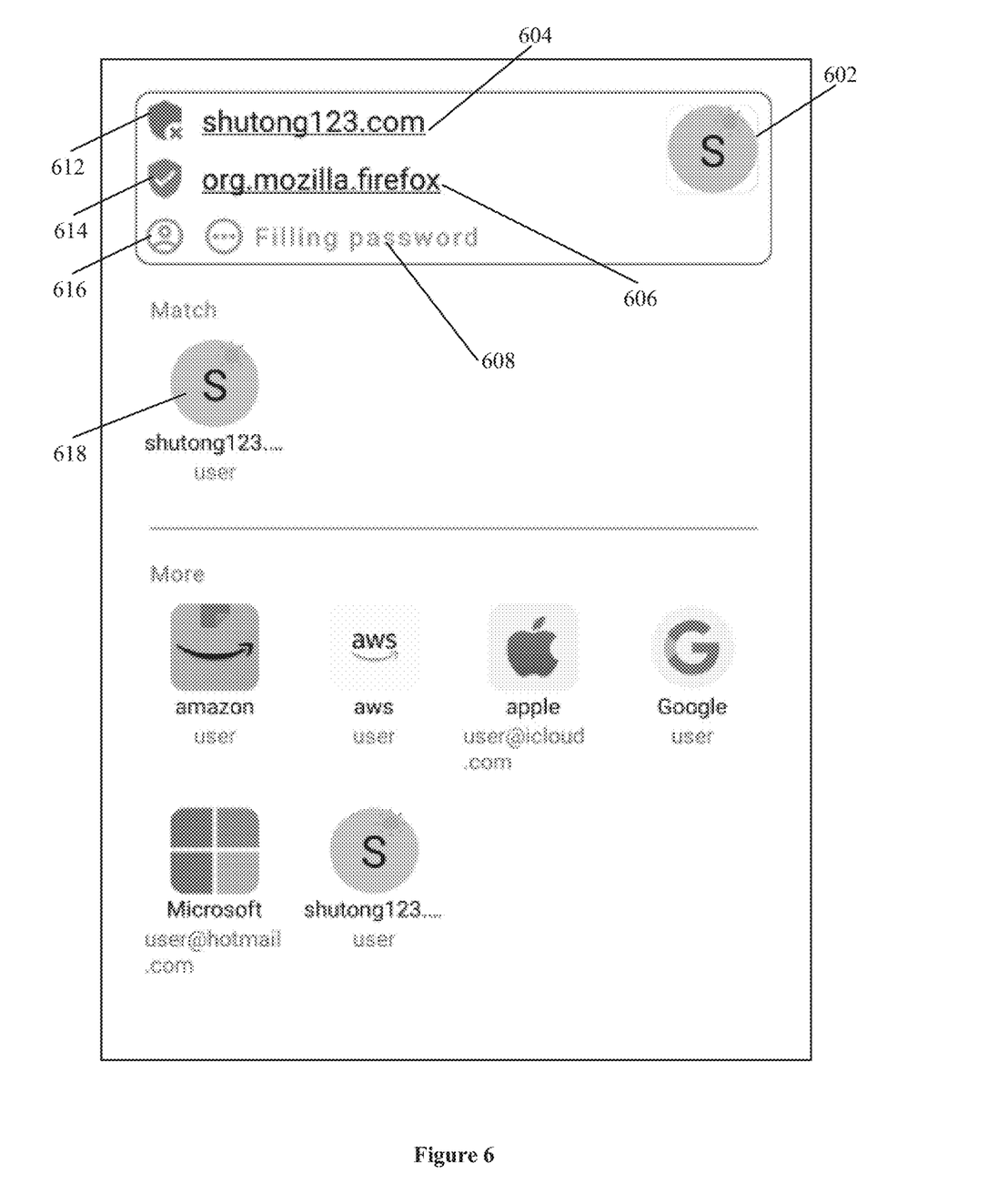
FIG. 6 is a block diagram illustrating an screen shot of the displayed context identifiers of a new password manager in accordance with this disclosure.

At 120, the password manager 422 displays the list of context identifiers of the computing source on a display screen of the electronic device 400. Illustrative screen shots of the displayed context identifiers are shown in FIGS. 5 and 6. Referring to FIGS. 5-6, illustrative screen shots of a smartphone mobile device with the context identifiers are shown and generally indicated at 500 and 600 respectively. The logos of the respective computing sources are indicated at 502 and 602. The respective web site addresses are indicated at 504 and 604 while the respective app IDs are indicated at 506 and 606. Each illustrative screen also shows a link requesting the user to fill in passwords, indicated at 508 and 608 respectively. Elements 516 and 616 each indicate filling a login username. Corresponding status indicators are displayed at 512, 514, 612 and 614 respectively. The new password manager 422 also displays the matched user accounts at 518 and 618 respectively.

At 132, the password manager 422 performs a computing source autofill security check on the computing source. Depending the electronic device 400 and the operating system 420, at 132, the password manager 422 may perform one or more autofill security checks on the computing source. For instance, at 134, the password manager 422 performs an autofill desktop browser security check on the computing source. At 136, the password manager 422 performs an autofill Android security check on the computing source. At 138, the password manager 422 performs an autofill iOS security check on the computing source.

For instance, the autofill desktop browser security check determines the web address 504 is an HTTPS (meaning Hypertext Transfer Protocol Secure) web address while the web address 604 is an HTTP (meaning Hypertext Transfer Protocol) web address. While an HTTPS connection is secure, an HTTP address is not secure. Accordingly, the corresponding status indicators 512 and 612 are displayed in, in one implementation, green and red colors respectively. When the user clicks or touches the links 512 and 612, a user message is shown in one implementation. The user message reads, for example, "HTTPS connection is secure. It is safe to submit password" or "HTTP connection is not encrypted. It is unsafe to submit password."

At 136, the password manager 422 performs the security check for Android platforms. It checks the app signature when the computing source's autofill fields are in an Android app. If the app signature matches the signature of the authentic app in the autofill security database 424, the mobile app is indicated at an authenticated app. Otherwise, it is indicated as an unauthenticated app. The password manager 422 also obtains the app ID of the computing source. When the computing source's autofill fields are in a web page, at 136, the password manager 422 determines whether the app ID matches a web browser indicated in the autofill security database 424. If so, at 136, the password manager 422 determines whether the web page is an HTTPS page or an HTTP page, and notifies the user with a corresponding user message accordingly. Otherwise, at 136, the password manager 422 determines whether these is a mobile app in the autofill security database 424 that is associated with the web page. If there is one, the login credentials associated with the identified mobile app and the web page can be safely autofilled into the web page.

When the computing source is a web page, at 138, the password manager 422 obtains the domain of the web page. The password manager 422 checks whether the web page uses HTTP or HTTPS. When the computing source is an app, which can be associated with a domain name, the password manager 422 can obtain the associated domain.

The status indicators 514 and 614 are displayed in different shapes and/or colors to indicate the respective autofill security check results of the app IDs 506 and 606 determined by the autofill security check at 132. Taking the mobile app ID 506 as an example, when it is authenticated by the autofill security check at 132 and the user clicks the button 514, a user message is displayed and reads, for instance, "Verified. The app is authentic." The user message indicates to the user that the mobile app is trustworthy and safe for the password manager 422 to fill the mobile app with the user's login credential of the matched user account 518.

When the mobile app ID 506 reads "com.amazon.mShop.android.shopping," fails the authentication of the autofill security check at 132, and the user clicks the button 514, a user message is displayed and reads, for instance, "Not a safe browser. You are filling the password in Amazon Shopping com.amazon.mShop.android.shopping, which is not in the safe browser list of the Password Manager. If it is a safe browser and you trust it, tap the Trust This Browser link below. You will not see this warning when filling any website password in safe browsers." The user message indicates to the user that the mobile app is not in the trustworthy and safe browser list for the password manager 422 to fill the mobile app with the user's login credential of the matched user account 518, because it is filling a web page indicated as 504. However, if the user trusts the app indicated at 506, the user is provided with a control, such as the illustrative link "Trust This Browser" present in the user message. Clicking the link causes the password manager 422 to update the autofill security database 424 to indicate that the mobile app ID indicated at 506 is a secure and trustworthy web browser. Accordingly, when auto filling another web page next time, the password manager 422 then autofills the login fields with the confidential credentials of the matched user account 518.

When the user clicks the password requesting button (or a link) 508 (or 608), the password manager 422 notifies the user with a user message that reads, for example, "Filling Password. Phishing App/Website may trick you if you do not see a password input field. Cancel this filling if you do not trust the App/Website."

When the computing source has successfully passed the autofill security check at 132, at 140, the password manager 422 matches the computing source to an account according to the autofill security database 424. The matching varies on different platforms. For instance, at 142, the password manager 422 determines the matched account on a desktop (or laptop) system. At 144, the password manager 422 determines the matched account on an Android system. At 146, the password manager 422 determines the matched account on an iOS system.

The user saves her/his accounts, such as Google, Apple, Microsoft and Twitter accounts. When auto-filling in a Twitter app on Android, the password manager 422 checks each account to determine whether it matches the Twitter Android app ID com.twitter.android. When checking against the Google account saved by the user, the password manager 422 checks the Google account's autofill security data in the autofill security database. The Android app ID list does not contain com.twitter.android. The match is thus not successful. The password manager 422 then checks against Apple, Microsoft and other accounts. The match fails against each account. When it checks against the Twitter account, the app ID is in the Android id list of the Twitter account in the autofill security database. The match is now a success. When matching a website, the password manager 422 checks against the login website list in the autofill security database 424. If the website matches an iOS app, the password manager 422 then checks the iOS app's associated domain list maintained within the autofill security database.

At 148, the password manager 422 displays the matched account on the display screen of the electronic device 400. Two illustrative matched accounts are indicated at 518 and 618 in FIGS. 5 and 6 respectively. The user selects a matched account or a different account. In response to the user selection, at 150, the password manager 422 selects the account.

After the selected account is determined, at 160, the password manager 422 performs further security check on the selected account. Depending on the operating system 420, the selected account security check includes a selected account desktop browser security check 162, a selected account Android security check 164, or a selected account iOS security check 166.

At 162, if the computing source is not in the list of associated login website addresses of the selected account stored in the autofill security database 424, the password manager 422 warns the user with, for example, a user message displayed on the screen of the electronic device 400. The warning indicates that the computing source is not a matched computing source. However, the user has the option to decide that the computing source is a trusted source by, for example, clicking a command link on the warning. In such a case, at 170, the password manager 422 updates the autofill security database 424 to indicate that the computing source is associated with the selected account. If the computing source is in the list of associated login website addresses of the selected account at 162, at 180, the password manager 422 autofills the login fields of the computing source with the login data of the selected account.

At 164, if the computing source's Android app signature does not match anyone stored in the autofill security database 424, the password manager 422 warns the user with, for example, a user message displayed on the screen of the electronic device 400. The warning indicates that it cannot verify the app signature, i.e., the Android app is not authentic. However, the user has the option to decide that the computing source is a trusted source by, for example, clicking a command link on the warning. In such a case, at 170, the password manager 422 updates the autofill security database 424 by adding the app's signature in. If the computing source's Android app signature does match one app signature of the selected account, at 180, the password manager 422 autofills the login fields of the computing source with the login data of the selected account.

At 164, if the computing source's Android app ID is not in the list of the selected account stored in the autofill security database 424, the password manager 422 warns the user with, for example, a user message displayed on the screen of the electronic device 400. The warning indicates that the computing source is not a matched computing source. However, the user has the option to decide that the computing source is a trusted source by, for example, clicking a command link on the warning. In such a case, at 170, the password manager 422 updates the autofill security database 424 to indicate that the computing source's Android app ID is associated with the selected account. If the computing source's Android app ID does match one app ID of the selected account, at 180, the password manager 422 autofills the login fields of the computing source with the login data of the selected account.

At 164, if the computing source is a web site and not in the list of associated login website addresses of the selected account stored in the autofill security database 424, the password manager 422 warns the user with, for example, a user message displayed on the screen of the electronic device 400. The warning indicates that the computing source is not a matched computing source. However, the user has the option to decide that the computing source is a trusted source by, for example, clicking a command link on the warning. In such a case, at 170, the password manager 422 updates the autofill security database 424 to indicate that the computing source is associated with the selected account. If the computing source is in the list of associated login website addresses of the selected account, at 180, the password manager 422 autofills the login fields of the computing source with the login data of the selected account.

When the user clicks the matched user account 518 (or 618), the password manager 422 automatically fills the computing source (such as a web page or a mobile app) with the confidential credentials of the matched user account 518. However, when the computing source identifier 506 is not authenticated successfully at 132, the message is different. The password manager 422 does not know whether the app is a trustworthy web browser, or an associated app. The password manager 422 asks the user to teach it. If the user clicks on "Trust this browser", the password manager 422 then updates the autofill security database 424 to indicate that the computing source is a trustworthy computing source. If the user clicks on the "Associate this app" control, the password manager 422 then updates the autofill security database to indicate that the app id is associated with the selected account as set forth in the previous paragraph. In a further implementation, in the user message, a control (such as a link) is provided such that clicking the link causes the password manager 422 to associate the computing source identifier 506 with the matched user account 518.

At 166, if the computing source is a web site and not in the list of associated login website addresses of the selected account stored in the autofill security database 424, the password manager 422 warns the user with, for example, a user message displayed on the screen of the electronic device 400. The warning indicates that the computing source is not a matched computing source. However, the user has the option to decide that the computing source is a trusted source by, for example, clicking a command link on the warning. In such a case, at 170, the password manager 422 updates the autofill security database 424 to indicate that the computing source is associated with the selected account. If the computing source is in the list of associated login website addresses of the selected account, at 180, the password manager 422 autofills the login fields of the computing source with the login data of the selected account.

At 166, if the computing source's associated domains are not in the iOS app associated domains of the selected account stored in the autofill security database 424, the password manager 422 warns the user with, for example, a user message displayed on the screen of the electronic device 400. The warning indicates that the computing source is not a matched computing source. However, the user has the option to decide that the computing source is a trusted source by, for example, clicking a command link on the warning. In such a case, at 170, the password manager 422 updates the autofill security database 424 to indicate that the computing source's associated domains are associated with the selected account. In other words, the computing source's associated domains are added to the iOS app associated domains of the selected account inside the autofill security database 424. If the computing source's associated domains are in the iOS app associated domains of the selected account stored in the autofill security database 424 at 166, at 180, the password manager 422 autofills the login fields of the computing source with the login data of the selected account.

At 170, the password manager 422 updates the autofill security database 424. For example, if the user trusts an unauthenticated app indicated at 506 by clicking with a control in a user message, such as the mentioned above with the illustrative link Trust This Browser, the password manager 422 updates the autofill security database 424 to indicate that the mobile app ID indicated at 506 is a secure and trustworthy computing source associated with the selected user account 518.

Figure 7:
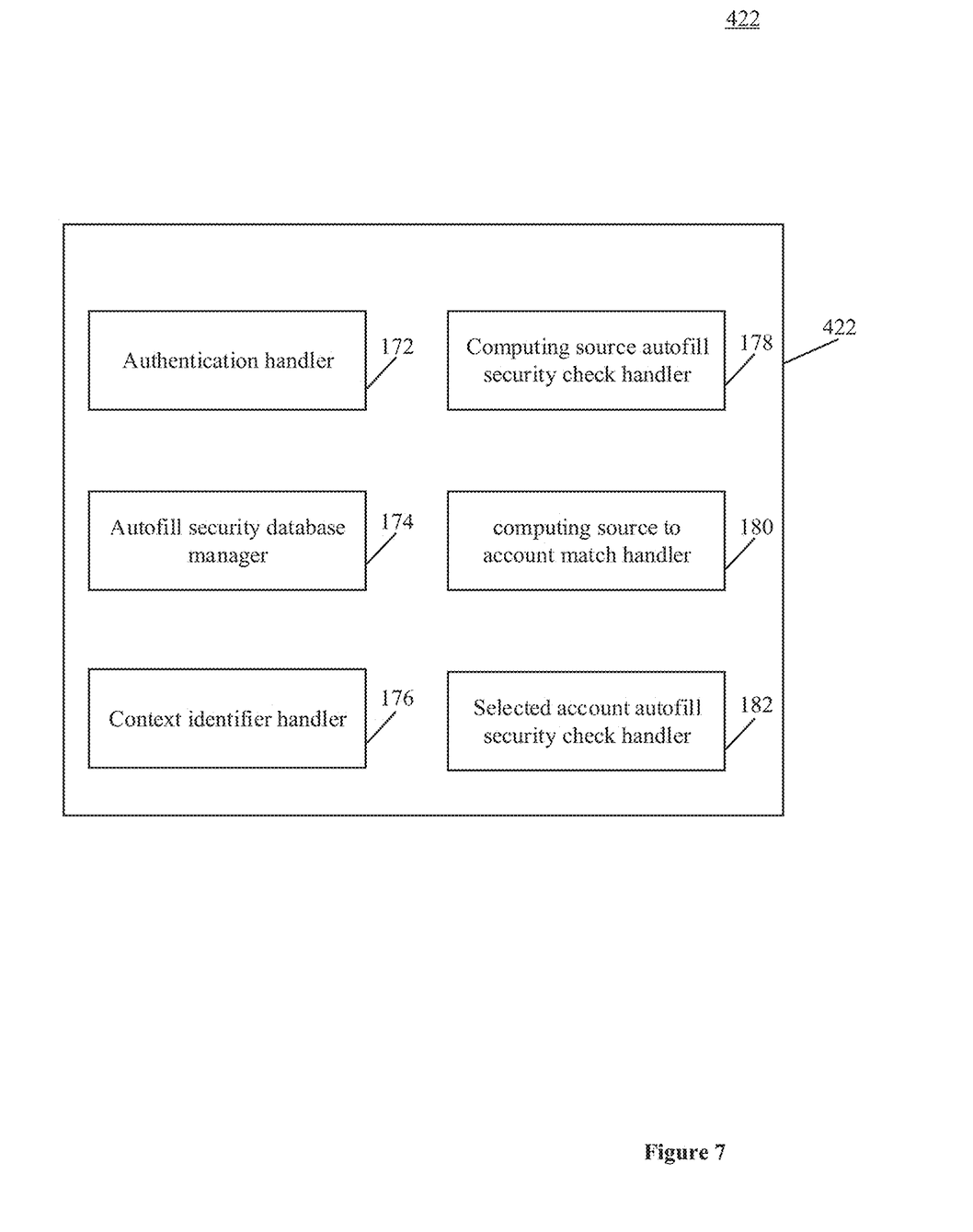
FIG. 7 is a block diagram illustrating a new password manager in accordance with this disclosure.

In one implementation, the elements 108, 110, 118, 120, 132, 140, 148 and 160 are performed by corresponding computer software components (or modules) of the password manager 422. An illustrative block diagram of the password manager 422 is shown in FIG. 7. For example, the element 108 is implemented by the authentication handler 172; the element 110 is implemented by the autofill security database manager 174; the elements 118 and 120 are implemented by the context identifier handler 176; the element 132 is implemented by the computing source autofill security check handler 178; the elements 140 and 148 are implemented by the computing source to account match handler 180; and the element 160 is implemented by the selected account autofill security check handler 182.

Obviously, many additional modifications and variations of the present disclosure are possible in light of the above teachings. Thus, it is to be understood that, within the scope of the appended claims, the disclosure may be practiced otherwise than is specifically described above.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A computer-implemented method for safely autofilling login fields in computing sources, said method performed by a password manager adapted to run in an electronic device and comprising:
   (1) receiving an autofill indicator indicating that an autofill control has been activated;
   (2) in response to said autofill indicator, authenticating a user to assure that said user is authorized to access said password manager;
   (3) building an autofill security database;
   (4) determining a list of context identifiers of a computing source based on a computing source identifier of said computing source, said computing source including a login input field, wherein said list of context identifiers includes more than one context identifier;
   (5) displaying said list of context identifiers on a display screen of said electronic device, wherein said electronic device including:
      (a) a processing unit;
      (b) a network interface operatively coupled to said processing unit;

(c) a video output interface operatively coupled to said processing unit;

(d) a memory element operatively coupled to said processing unit; and (e) an input interface operatively coupled to said processing unit;

(6) performing a computing source autofill security check on said computing source;

(7) when said computing source autofill security check is successful, matching said computing source to an account according to said autofill security database;

(8) displaying said matched account on said display screen of said electronic device;

(9) selecting an account for autofilling said login input field, wherein said selected account is said matched account or a different account;

(10) performing an account autofill security check on said selected account; and (11) when said account source autofill security check is successful, autofilling said login input field with login data associated with said selected account.

2. The method of claim 1, wherein said list of context identifiers includes at least one of an Android app ID, an iOS (iPhone Operating System) associated domain, a filling username identifier or a filling password identifier associated with said computing source.

3. The method of claim 1, wherein said list of context identifiers includes at least one of a website address, a website logo or a mobile app logo associated with said computing source.

4. The method of claim 1 further comprising:

1) parsing user interface elements of said computing source to determine that said login input field in present in said computing source;

2) determining said computing source identifier of said computing source; and 3) displaying an autofill control, wherein activating said autofill control causes said autofill indicator generated.

5. The method of claim 1, wherein said autofill security database includes at least a collection of login website, a collection of Android app IDs, or a collection of associated iOS web domains for each account system.

6. The method of claim 1, wherein said autofill security database includes an autofill Android browser database.

7. The method of claim 1, wherein said autofill security database includes an autofill Android app certificate signature database.

8. The method of claim 1, wherein said performing a computing source autofill security check on said computing source includes performing an autofill desktop browser security check on said computing source.

9. The method of claim 1, wherein said performing a computing source autofill security check on said computing source includes performing an autofill Android security check on said computing source.

10. The method of claim 1, wherein said performing a computing source autofill security check on said computing source includes performing an autofill iOS security check on said computing source.

11. The method of claim 1, wherein said matching said computing source to an account according to said autofill security database includes matching said computing source to said matched account according to said autofill security database in a desktop system.

12. The method of claim 1, wherein said matching said computing source to an account according to said autofill security database includes matching said computing source to said matched account according to said autofill security database in an Android system.

13. The method of claim 1, wherein said matching said computing source to an account according to said autofill security database includes matching said computing source to said matched account according to said autofill security database in an iOS system.

14. The method of claim 1, wherein performing an account autofill security check on said selected account includes performing an autofill desktop browser security check on said selected account.

15. The method of claim 1, wherein performing an account autofill security check on said selected account includes performing an autofill Android security check on said selected account.

16. The method of claim 1, wherein performing an account autofill security check on said selected account includes performing an autofill iOS security check on said selected account.

17. The method of claim 1 further comprising updating said autofill security database based on a user input.

* * * * *